(12) United States Patent
Infosino

(10) Patent No.: US 6,738,467 B1
(45) Date of Patent: May 18, 2004

(54) SELECTIVE CALL WAITING SERVICE

(75) Inventor: William J. Infosino, Watchung, NJ (US)

(73) Assignee: AT&T Corp., New York, NY (US)

( * ) Notice: Subject to any disclaimer, the term of this patent is extended or adjusted under 35 U.S.C. 154(b) by 282 days.

(21) Appl. No.: 10/012,967

(22) Filed: Oct. 24, 2001

Related U.S. Application Data

(63) Continuation of application No. 09/106,984, filed on Jun. 29, 1998, now Pat. No. 6,343,121.

(51) Int. Cl.7 ............................................. H04M 3/42
(52) U.S. Cl. .................................................. 379/215.01
(58) Field of Search ................. 379/88.16, 88.19–88.28, 379/196–200, 229, 230, 246, 252, 257, 274, 277, 297, 201.01, 211.01, 212.01, 213.01, 214.01, 215.01, 372, 373.01, 373.02, 373.04, 374.02, 377

(56) References Cited

U.S. PATENT DOCUMENTS

| | | |
|---|---|---|
| 4,995,074 A | 2/1991 | Goldman et al. |
| 5,274,700 A | 12/1993 | Gechter et al. |
| 5,363,431 A | 11/1994 | Schull et al. |
| 5,428,608 A | 6/1995 | Freeman et al. |
| 5,533,110 A | 7/1996 | Pinard et al. |
| 5,712,907 A | 1/1998 | Wegner et al. |
| 5,724,412 A | 3/1998 | Srinivasan |
| 5,742,596 A | 4/1998 | Baratz et al. |
| 5,751,706 A | 5/1998 | Land et al. |
| 5,768,513 A | 6/1998 | Kuthyar et al. |
| 5,805,587 A | 9/1998 | Norris et al. |
| 5,809,128 A | 9/1998 | McMullin |
| 5,825,867 A * | 10/1998 | Epler et al. ............ 379/215.01 |
| 5,870,565 A | 2/1999 | Glitho |
| 5,894,504 A * | 4/1999 | Alfred et al. ............ 379/88.13 |
| 5,896,444 A | 4/1999 | Perlman et al. |
| 5,916,302 A | 6/1999 | Dunn et al. |
| 5,946,381 A | 8/1999 | Danne et al. |
| 6,011,909 A | 1/2000 | Newlin et al. |
| 6,343,121 B1 * | 1/2002 | Infosino ................. 379/215.01 |

FOREIGN PATENT DOCUMENTS

| | | |
|---|---|---|
| CA | 2138565 | 12/1994 |
| DE | 3315884 | 5/1983 |
| EP | 0 758 175 A1 | 12/1995 |
| EP | 0 794 643 A2 | 9/1997 |
| EP | 0 800 325 A2 | 10/1997 |
| EP | 0 856 981 A2 | 8/1998 |
| EP | 0 905 959 A2 | 3/1999 |
| JP | 05004142 | 8/1994 |
| JP | 05343162 | 7/1995 |
| WO | WO 95/18501 | 7/1995 |
| WO | WO 97/14238 | 4/1997 |

(List continued on next page.)

OTHER PUBLICATIONS

Nathan Muller, "Dial 1–800–Internet" Byte, 1996, vol. 21, Issue 2, Feb. 1996.

R. Babbage, I Moffat, A O'Neill and S. Sivaraj, "Internet Phone–Changing the telephony paradigm" BT Technol J vol. 15, No. 2, Apr. 1997.

IBM Technical Disclosure Bulletin "Workstation Communications System",. IBM Technical Disclosure Bulletin, vol. 37 No. 09, Sep. 1994.

(List continued on next page.)

Primary Examiner—Robert G. Foster

(57) ABSTRACT

A communications system is designed to present a number of options to a caller who is attempting to reach a call-waiting subscriber already busy on a first call. The options are presented to the caller via an announcement that offers the caller the alternative of either sending immediately a conventional call-waiting alert signal to the subscriber, or leaving a message that is automatically delivered to the subscriber immediately after the subscriber terminates the first call.

10 Claims, 2 Drawing Sheets

FOREIGN PATENT DOCUMENTS

| | | |
|---|---|---|
| WO | WO 97/16007 | 5/1997 |
| WO | WO 97/37483 | 10/1997 |
| WO | WO 97/46073 | 12/1997 |
| WO | WO 97/47118 | 12/1997 |
| WO | WO 97/47119 | 12/1997 |
| WO | WO 97/47127 | 12/1997 |
| WO | WO 98/01985 | 1/1998 |
| WO | WO 98/07266 | 2/1998 |
| WO | WO 98/19240 | 5/1998 |
| WO | WO 98/19448 | 5/1998 |
| WO | WO 98/19471 | 5/1998 |
| WO | WO 98/24224 | 6/1998 |
| WO | WO 98/36551 | 8/1998 |
| WO | WO 98/41032 | 9/1998 |
| WO | WO 98/51063 | 11/1998 |
| WO | WO 98/52332 | 11/1998 |
| WO | WO 98/52339 | 11/1998 |
| WO | WO 98/53617 | 11/1998 |
| WO | WO 98/54871 | 12/1998 |
| WO | WO 99/14924 | 3/1999 |

OTHER PUBLICATIONS

Cui–Qing Yang, "INEtPhone—Telephone Services and Servers on Internet", University of North Texas, Apr. 1995.

S. Harris, N. Psimenatos, P. Richards, I. Ebert, "Intelligent Network Realization and Evolution: CCITT Capability Set 1 and Beyond" International Switching Symposium, Oct. 1992, vol 2.

Colin, Low "The Internet Telephony Red Herring" HP Laboratories Bristol, Jun. 1996.

* cited by examiner

SELECTIVE CALL WAITING SERVICE

This application is a continuation of Ser. No. 09/106,984 filed Jun. 29, 1998 now U.S. Pat. No. 6343,121.

Technical Field

This disclosure relates to communications systems and, more particularly, to an improved call-waiting feature.

BACKGROUND

Over the last thirty years, many new features have been added to the rich set of features already available to communications services subscribers. Such new features include call waiting, call forwarding, three-way calling, speed dialing, voice messaging, and automatic callback, to name a few. The call-waiting feature is perhaps the most widely used communications services feature for many reasons, not the least of which are its relatively low cost (no additional end-user device required) and its simple user interface (user-friendly hook flash). In essence, the call-waiting feature allows a subscriber who is already busy on a first call to be alerted to the presence of a second call in waiting. Such alert typically takes the form of a signal that is transmitted in-band to the call-waiting subscriber, in complete disregard of the conversation that is taking place between the subscriber and the other party of the first call (hereinafter "the first party"). Call-waiting subscribers have always resented the ill-mannered interruption of the call-waiting alert signal. Nevertheless, their apprehension of losing important calls has impelled call-waiting subscribers to tolerate, albeit grudgingly, the brusqueness of the call-waiting alert signal.

The threshold of tolerance of a call-waiting subscriber is quite often ruggedly tested when the subscriber interrupts a first important call to answer a second call presumed to be important, only to find out that the second call is unimportant or, worse yet, a nuisance call. To make matters worse, when the call waiting subscriber has to interrupt an important conversation with the first party to take the call-in-waiting, the unsuspecting second caller more often than not, incurs the wrath of the call-waiting subscriber, even though the second caller could not have prevented the interruption.

Equally bothersome is the impression of benign neglect that may be felt by the first party after being placed on hold for the benefit of the second caller. The feeling of benign neglect is especially intense when the first party knows that the subscriber could have simply ignored the second in waiting, if the subscriber so desired However, if the call-waiting subscriber ignores the call in waiting, in an attempt to vitiate any potential feeling of neglect from the first party, the subscriber runs the risk of losing the call in waiting without the benefit of even a message from the caller-in-waiting. This is because the operations of an answering machine (e.g., delivery of a greeting announcement and recording of a message) are triggered when the answering machine receives at least one ringing tone signal from a network office switch. Unfortunately, when a call waiting subscriber is already engaged in a first call, the subscriber's answering machine does not receive the appropriate ringing tone signal to trigger the operations of the subscriber's answering machine.

In response to this problem, some switch manufacturers have introduced the so-called "call waiting id" feature. Basically, the feature provides on a screen of a caller-id box, a display of the name and/or number of a caller in-waiting who is attempting to reach a call-waiting subscriber already engaged in a first call. The call-waiting id feature has certain economic disadvantages and other limitations that make such features unattractive to certain subscribers. For example, the name and/or number information delivered to the call waiting subscriber may be worthless or misleading if the call-in-waiting is originated from a public telephone booth or a telephone set that is not associated with the caller's mobile number, residential number or work number. In addition, the call waiting id feature requires a communications services user to subscribe to two separate communications services features, namely, caller-id and call waiting. Furthermore, some communications carriers charge an additional monthly fee for call-waiting id above and beyond the monthly charges for caller-id and call waiting. Worse yet, a caller-id and call-waiting subscriber who wishes to subscribe to the call-waiting id feature may need to replace his or her caller-id box with a special "call-waiting-id-capable" caller-id hardware to benefit from the call-waiting-id feature. Finally, the call-waiting id feature does not spare the subscriber of the brusqueness of the call-waiting alert signal.

It is thus desirable to provide to a caller-in-waiting cost-effective methods of alerting a call waiting subscriber of his or her incoming call.

SUMMARY

The present disclosure is directed to a method and a system that allow a communications network to offer to a caller who is attempting to reach a call-waiting subscriber already busy on a first call, a set of options for alerting the subscriber to the existence of the second call. The options are presented to the caller via an announcement that offers the caller the alternative of either sending immediately a conventional call-waiting alert signal to the subscriber, or leaving a message that is automatically delivered to the subscriber immediately after the subscriber terminates the first call.

In an exemplary embodiment of the principles disclosed herein, a voice information system of the communications network delivers the announcement to the caller. The announcement informs the caller that the call-waiting subscriber is busy on a first call before presenting such caller with two options. In the first option, the caller is prompted to enter a particular number on the dial pad of the caller's telephone set to initiate immediate delivery of a call-waiting alert signal to the call-waiting subscriber's telephone set. It is assumed that the caller will select the first option if the caller deems his or her call to be important. In the second option, the caller is invited to enter a distinct number on the keypad of the telephone set being used if he or she wishes to record a message for the call-waiting subscriber, in lieu of sending a call waiting alert signal. The announcement also assures the caller that the recorded message will be delivered to the call-waiting subscriber upon availability of the call-waiting subscriber's line.

When the caller chooses the first option, the voice information system transmits a call processing message to the network office switch of the call-waiting subscriber directing the switch to send the call-waiting alert signal to the telephone set of the call-waiting subscriber. If the caller selects the second option, the voice information system directs the caller to record a message for the call-waiting subscriber. While the caller is recording the message destined for the call-waiting subscriber, the network office switch that is coupled to the call-waiting subscriber's line monitors such line for on-hook condition. If the call-waiting subscriber's line does become available during the message recording process, the network office switch terminates such process to apply a ringing tone to the call waiting subscriber's telephone set.

After the message recording process has ended, the network office switch that is coupled to the call-waiting subscriber's line continues to monitor such line for on-hook condition. When the call-waiting subscriber's line does become available, the network office switch applies a ringing tone to the call-waiting subscriber telephone set while sending a call processing message to the voice information service for the retrieval of the recorded message. If the call-waiting subscriber answers the telephone, the network office switch establishes a communications path between the subscriber and the voice information system for delivery of the recorded message to the call-waiting subscriber.

DETAILED DESCRIPTION

Figure 1:
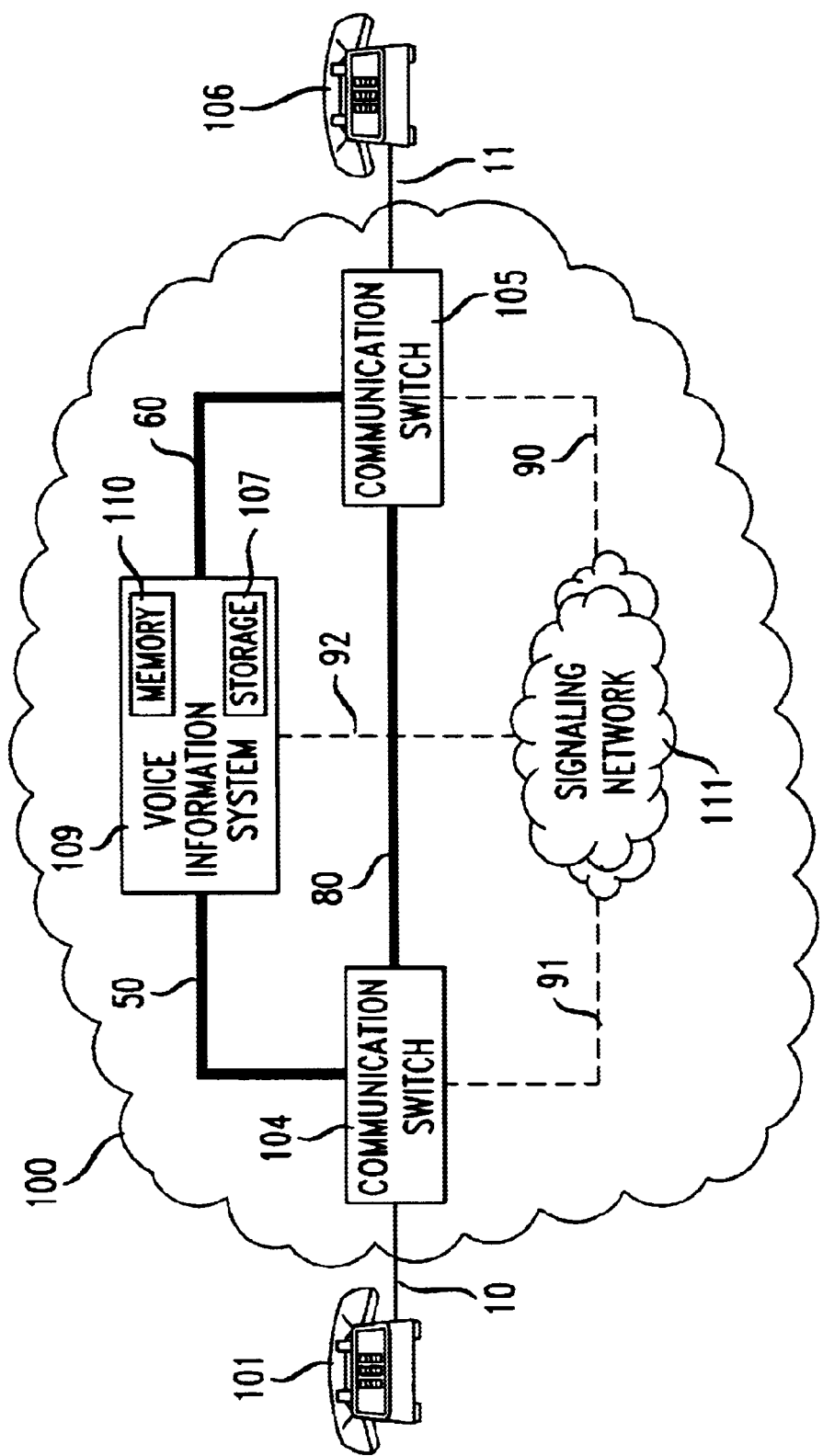
FIG. 1 shows in block diagram format a communications network arranged in accordance with the principles disclosed therein to offer callers different options for alerting call-waiting subscribers of incoming calls in waiting.
Figure 2:
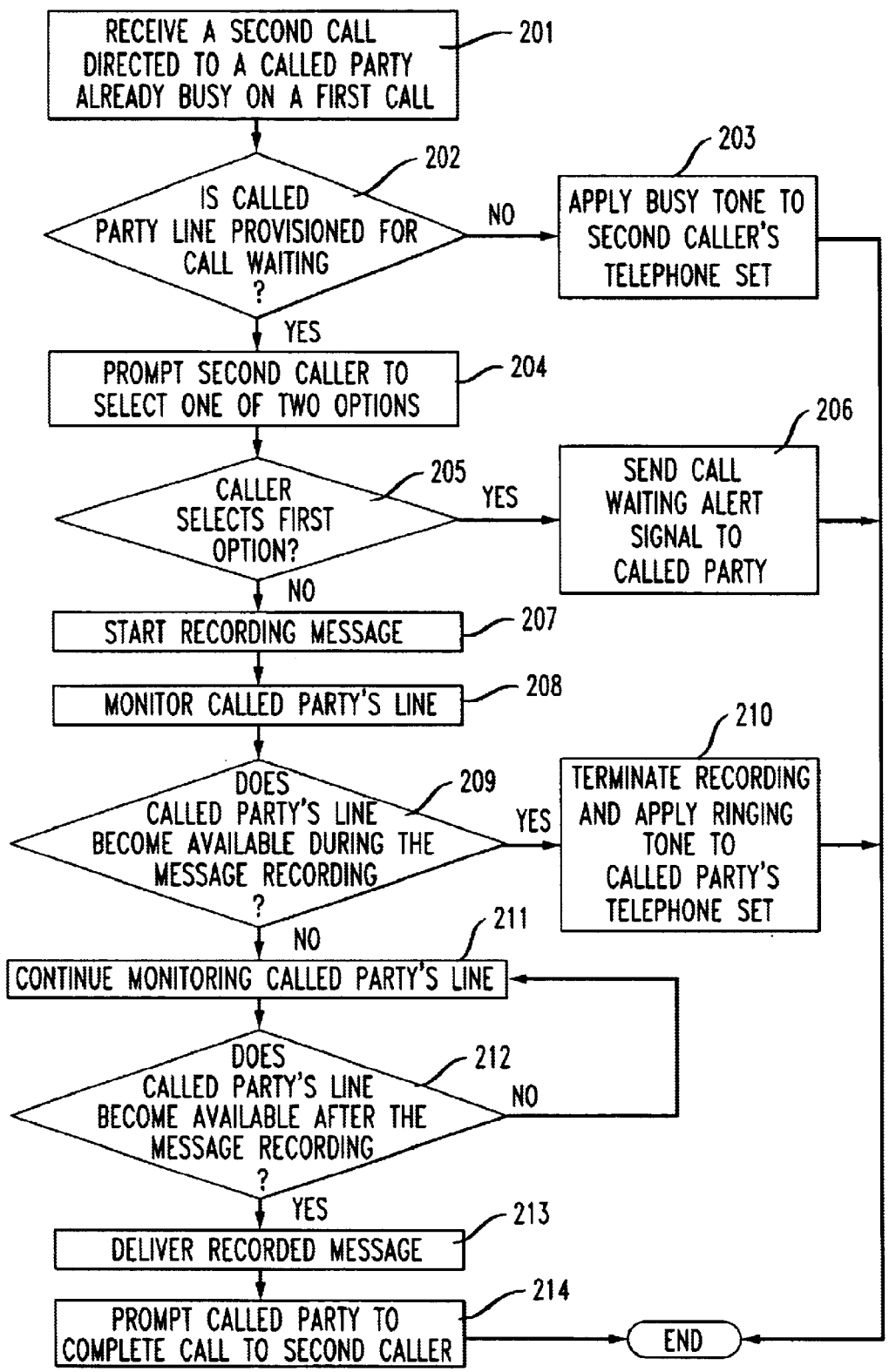
FIG. 2 illustrates programmed instructions executed by different components of FIG. 1 to implement options offered to callers for alerting call waiting subscribers of incoming calls in waiting.

FIG. 1 shows in block diagram format a communications network 100 which includes access/egress communications switches 104 and 105 that are connected to a common voice information system 109 via trunk facilities 50 and 60, respectively. Switches 104 and 105 are processor-controlled, software-driven communications systems that are arranged to route calls to destinations specified in call setup information received from end-user devices such as analog telephone sets 101 and 106. A well-known communications switch is the Lucent Technologies 5ESS® switch whose features and functionality are described in different articles published in the *AT&T Technical Journal*, Vol. 64, No. 6, part 2, pp. 1305–1564, July/August, 1985. Communications switch 104 (105) also includes internal tables that correlate a subscriber's line to communications services features associated with that line. For example, the internal table of communications switch 105 indicates that the subscriber's line for telephone sets 101 and 106 are Plain Old Telephone Service (POTS) facilities 10 and 11, respectively.

Illustratively, the internal table of communications switch 105 may also indicate that telephone 106 is provisioned for call waiting service. It is wort nothing that although the communications system 100 of FIG. 1 does not show (for the sake of simplicity) any toll switches or Inter-exchange carrier network, it is to be understood that one or more toll switches may be included in communications system 100.

Communications switches 104 and 105 exchange call processing messages via signaling trunks 90 and 91 and a signaling network 111 which is comprised of a plurality of interconnected packet switching nodes that route call processing messages to their appropriate destinations according to a defined protocol, such as the well-known Common Channel Signaling (CCS) protocol. Trunk 80 carries telephone traffic other than signaling information between switches 104 and 105.

Also shown in FIG. 1 is voice information system 109 that includes a call processing unit that is arranged to execute a set of scripts stored therein. Such scripts are executed to answer an incoming call and to greet a caller with a pre-recorded voice announcement inviting the caller to leave a message for a called party. Voice information system 109 selects a particular set of scripts to be executed based on particular call processing messages received from communications switch 104 (105). A call processing message may instruct voice information system 109 to play a specific announcement to a caller based on terminating supervisory signals or call progress tones (busy, ring-no-answer) associated with an attempted call. For example, an announcement may indicate to a caller that the line for the called party is currently busy and the caller may either press "1" to send a call-waiting alert signal to the called party, or may press "2" to record a message that will be delivered to the called party as soon as the called party's line becomes available. Such an announcement, hereinafter called a "call-waiting announcement" may be a generic announcement that is delivered to all callers in waiting attempting to reach any call waiting subscriber. Alternatively, the announcement delivered by voice information system 109 may be a personalized announcement pre-recorded by the call-waiting subscriber. In the latter case, the call-waiting subscriber would dial a particular number associated with the administrative functions of voice information system 109. The call-waiting subscriber would be prompted to enter his or her telephone number and a Personal Identification Number (PIN) Thereafter, the call-waiting subscriber would be prompted to record his or her personalized announcement.

Voice information system 109 also includes a memory 110 and a storage area 107. Memory 110 stores the script call processing messages and the digitized file representations of the announcements. Storage area 107 contains the voice mailboxes that store recorded messages for call waiting subscriber's lines. A voice information system may be implemented using a suitably modified Lucent Technologies Intuity® Voice System whose architecture and features are described in an article entitled "Conversant Voice System and Applications" by Pardue et al. that was published in *AT&T Technical Journal* Vol. 65, Issue 5, pp. 34–47, September/October. 1986.

When voice messaging system is recording a message destined for a call-waiting subscriber, the network office switch to which the telephone set of the called party is connected, "listens" to supervisory signals (busy or line available) in order to take specific actions. For example, when switch 104 (105) detects that the line for a called party is available, switch 104 (105) may terminate the message recording process and apply a ringing tone to the called party's telephone set. It is worth noting that although FIG. 1 shows a single messaging processing system 109 being connected to both communications switches 104 and 105, it is to be understood that multiple messaging processing systems may be connected to individual switches without departing from the principles being disclosed herein.

Optionally, communications switching system 100 of FIG. 1 may be replaced with a computer network (not shown) that is comprised of interconnected processing nodes (including a messaging complex) arranged to a) switch digital signals according to a common addressing protocol, such as the Internet Protocol (IP), and b) to deliver messaging information to callers in-waiting.

The process contemplated by this disclosure is initiated in step 201 when communications system 100 receives a second call that is directed to a called party who is already busy on a first call. In order to facilitate a clearer explanation of the inventive concept disclosed herein, it would be assumed that the second call is initiated from telephone set 101, and is directed to telephone set 106. Upon receiving the call setup information from telephone set 101, communications switch 104 forwards the call setup information to communications switch 105 via signaling network 111.

Communications switch 105 uses its internal tables to ascertain whether the called party line i.e., line 11, is a call-waiting subscriber's line. If line 11 is not provisioned for call waiting, as determined in step 202, communications switch 105 sends a call processing message to communications switch 104 instructing switch 104 to apply a busy tone to telephone set 101 in step 203. If line 11 is a call-waiting subscriber line, as determined in step 202, communications switch 105 sends a call processing message to voice information system 109 to instruct voice information system 109 to execute the call waiting announcement script described above. Such call-processing message includes the caller's telephone number as well as the called party's telephone number. Specifically, voice information system 109, upon receiving the call processing message from communications switch 105, fetches memory 110 to retrieve the call-waiting announcement that is delivered to the caller in step 204. As indicated above, the announcement offers the caller the option of either sending a call-waiting alert signal to the called party's telephone set by pressing "1", or to record a message to be delivered to the called party as soon as the line becomes available by pressing "2". Alternatively, the caller may be prompted to utter "1" or "2" when voice information system 109 includes speech recognition hardware and software. If the caller selects the first option, as determined in step 205, voice information system 109 fetches memory 110 to retrieve a call processing message that is forwarded to communications switch 105. Upon receiving the call-processing message, communications switch 105, in step 206, applies an in-band call waiting alert signal to telephone set 106.

When the caller selects the second option, as determined in step 205, voice information system 109 in step 207, delivers a second announcement to the caller inviting him or her to start recording a message after the delivery of a high pitch tone. Voice information system 109 time stamps the recorded message and stores such message in a voice mailbox associated with the telephone number of the call waiting subscriber. While the message is being recorded, communications switch 105 in step 208, monitors the called party's line i.e., line 11, to ascertain whether the line is no longer seized. If line 11 becomes available during the message recording process, as determined in step 209, communications switch 105 in step 210, interrupts the message recording process and applies a ringing tone to telephone 106. If line 11 remains seized throughout the message recording process, as determined in step 209, communication switch 105 in step 211, continues to monitor the line after the message recording process is terminated. Communications switch 105 continues to monitor line 11 in step 211 until the line becomes available, as determined in step 212. Immediately after the line becomes available, communications switch 105 applies a ringing tone to the call waiting subscriber's telephone set while simultaneously sending a call processing message to voice information system 109 to trigger the delivery of the recorded message to the call waiting subscribe. The call processing message includes the call waiting subscriber's telephone number that is used by voice information system 109 to retrieve from storage area 107 the recorded message from the voice mail box associated with that telephone number.

When the call-waiting subscriber answers the call, communications switch 105 establishes a communications path from the caller's telephone set, i.e., set 106 to voice information system 109 for delivery of the recorded message in step 213. Optionally, voice information system 109 may deliver an announcement before the recorded message. Such an announcement may indicate, for example, the number of recorded messages, if appropriate, the time such recorded message was received by voice information system 109, as well as the telephone number of the caller. If more than one message was recorded while the call-waiting subscriber was on the line, the recorded messages are delivered by voice information system 109 in the chronological order in which the messages were recorded, i.e., first message recorded, first message delivered. Alternatively, such recorded messages may be delivered in reverse chronological order, i.e., last message recorded, first message delivered.

If the call-waiting subscriber does not answer the call for delivery of the recorded message, communications switch 105 may re-initiate the call after a pre-determined period of time. Alternatively, if the call-waiting subscriber is also a voice mail subscriber, communications switch 105 may apply a stutter dial tone to telephone set 106 when an off-hook condition is detected for such telephone set.

After a record message is delivered to the caller, voice formation system 109, in step 214, may optionally prompt the call-waiting subscriber to press a key on the dial pad of telephone set 106, if the subscriber wishes for communications network 100 to dial the telephone number of the party who recorded the message.

The foregoing is to be construed as being only an illustrative embodiment of the principles of this disclosure. Persons skilled in the art can easily conceive of alternative arrangements providing functionality similar to this embodiment without any deviation from the fundamental principles or the scope of this disclosure.

What is claimed is:

1. A method implemented by a communications services provider for processing a call in waiting, said method comprising the steps of:
   receiving call setup information for an incoming call that is initiated from a telephone set by a caller and is destined for a call waiting subscriber who is busy on a first call;
   delivering an announcement to said caller, said announcement giving said caller at least two options, said options comprising a) delivering a call waiting alert tone to said subscriber's telephone set, and b) recording a message, including a timestamp indicating the time of recording, to be delivered to said subscriber substantially immediately after termination of said first call; and
   monitoring a telephone line associated with said call waiting subscriber to recognize the termination of said first call during recording of the message by the caller and, in the event of the termination of said first call terminating said recording of said message and establishing a communications path between said call waiting subscriber and said caller.

2. The method as defined in claim 1 wherein during the receiving step, call setup information is received from a plurality of callers all destined for the same call waiting subscriber who is busy on a first call.

3. The method as defined in claim 2 wherein the method further comprises the steps of:
   receiving a signal from at least two callers in the plurality of callers that said at least two callers wish to record a message destined for said call waiting subscriber;
   delivering another announcement inviting each caller to start recording said message, and
   receiving, timestamping and recording each message from each caller.

4. The method as defined in claim 2 wherein the method further comprises the step of:

upon termination of the first telephone call, delivering an announcement to the call waiting subscriber including the number of recorded messages.

5. The method as defined in claim 2 wherein the delivered announcement further comprises the timestamps and telephone numbers of each caller.

6. The method as defined in claim 2 wherein the method further comprises the step of delivering each recorded message in chronological order.

7. The method as defined in claim 2 wherein the method further comprises the step of delivering each recorded message in reverse chronological order.

8. A communications system for processing calls in-waiting, the system comprising a communications switch which transmits a call-processing message indicating that said switch received from a caller an incoming call that was initiated by said caller from a telephone set and is destined for a call-waiting subscriber who is already busy on a first call; and a voice information system which receives said call-processing message prompts said caller to select from a set of options to process said call, said options comprising a) delivering a call waiting alert tone to said subscriber's telephone set and b) recording a message to be delivered to said subscriber substantially contemporaneously with the termination of said first call, and monitors a telephone line associated with said call-waiting subscriber line to terminate recording and establish a communication path between the caller and the call-waiting subscriber when the first call is termination the voice information system including a speech recognition unit for recognizing the selected option when voice commands are used by said caller.

9. The system as defined in claim 8 wherein the communications switch and voice information system are included in a computer network comprising interconnected processing nodes arranged to switch digital signals according to a common addressing protocol and deliver messaging information to callers in-waiting.

10. The system as defined in claim 7 wherein the common addressing protocol comprises the Internet Protocol (IP).

* * * * *